Sept. 19, 1933.  F. C. RUEHL  1,927,073
AIR WASHER
Filed Aug. 26, 1932   2 Sheets-Sheet 1

INVENTOR:
FERDINAND C. RUEHL
BY Arthur C. Eckert
ATTORNEY

Sept. 19, 1933.　　　　F. C. RUEHL　　　　1,927,073
AIR WASHER
Filed Aug. 26, 1932　　　2 Sheets-Sheet 2

INVENTOR:
FERDINAND C. RUEHL
BY Arthur C Eckert
ATTORNEY

Patented Sept. 19, 1933

1,927,073

UNITED STATES PATENT OFFICE 1,927,073

AIR WASHER

Ferdinand C. Ruehl, St. Louis, Mo.

Application August 26, 1932. Serial No. 630,548

1 Claim. (Cl. 261—116)

The object of my invention is to make an air washer that gives a maximum space efficiency, in other words, one that requires as little space for a given size as possible.

Further objects are to insulate the washer chamber against thermal losses to the exterior and to recover and preserve whatever losses there may be through the wall of the washer chamber; to have the air in contact with the water as long as possible and to travel the maximum distance within the smallest space; to cause the air to travel through the washer chamber in a rotary or spiral motion about the longitudinal axis of the chamber; to increase the contact between the air and the water spray; to increase the velocity of the air travel; to increase the length of time the treated air is in contact with the spray; to have the air and water pass in the same direction through the washer; to have the water assist the passage of the air through the washer; to have the air and water enter the washer tangentially; to produce a swirling and highly turbulent action of the air in passing through the washer chamber, thus bringing the air into more intimate contact with the spray; to produce a path of travel of the air in passing through the washer chamber several times the length of that which could be attained in the conventional type washer of equal length or of equal cross sectional area at any point, along the path of travel and of equal net volumetric content of the washer chamber.

The principal feature is the introduction of the air into the washer chamber tangentially, and so as to cause the air to travel in a rotational or spiral motion about the longitudinal axis of the washer chamber, which may be accomplished by means of louvres, whose vanes direct the entering air, so as to obtain the desired result, or by means of entering ducts, so affixed that they cause the air to enter the chamber tangentially by fans or blowers attached or connected to the washer chamber in such manner as to cause the air to enter the chamber tangentially.

A further object is to introduce the spray of liquid into the washer chamber at such an angle and at such points about the longitudinal axis of the chamber, so that the impingement or impact of the liquid spray upon the air will cause the air to travel in a rotating or spiral motion about the longitudinal axis. The propelling force of the spray applied to the air within the spray chamber causes the air to travel as indicated, whether the spray be introduced by means of the ordinary nozzle, or by means of nozzles in pipes or by means of the various types of spray producers, operating on the principle of centrifugal force, or by means of a fan or blower simultaneously acting as spray producers.

By the use of the device herein described, all the relatively heavy materials, such as dirt, soot and other foreign matter in the air will fly outwardly through the shell and the washer chamber, where they will be washed down by the water; thus the washing and cleaning effect will be much more thorough and efficient than that of an ordinary washer. By the use of eliminator plates, the water that remains in the air, after it has been washed is precipitated into the washer.

With these and other objects in view, my invention has relation to certain novel features of construction and arrangement of parts, as will be hereinafter more fully described, pointed out in the claim and illustrated in the drawings in which Fig. 1 is a front view of the washer.

Figure 1:
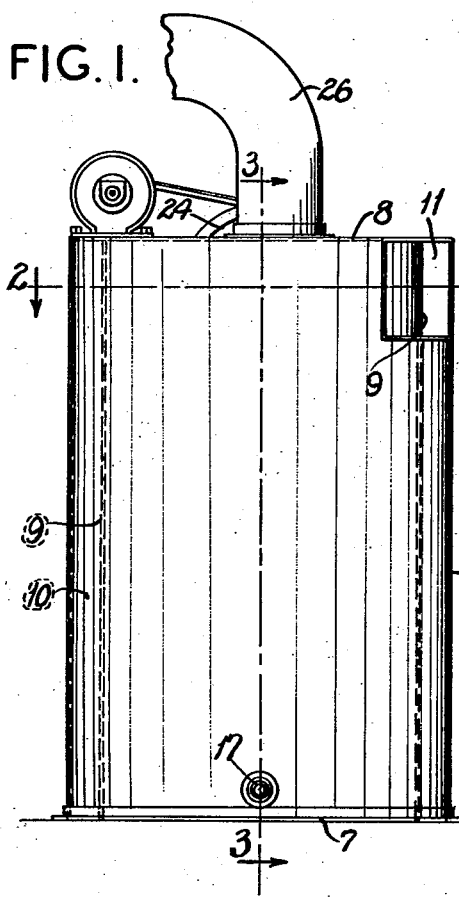
Figure 3:
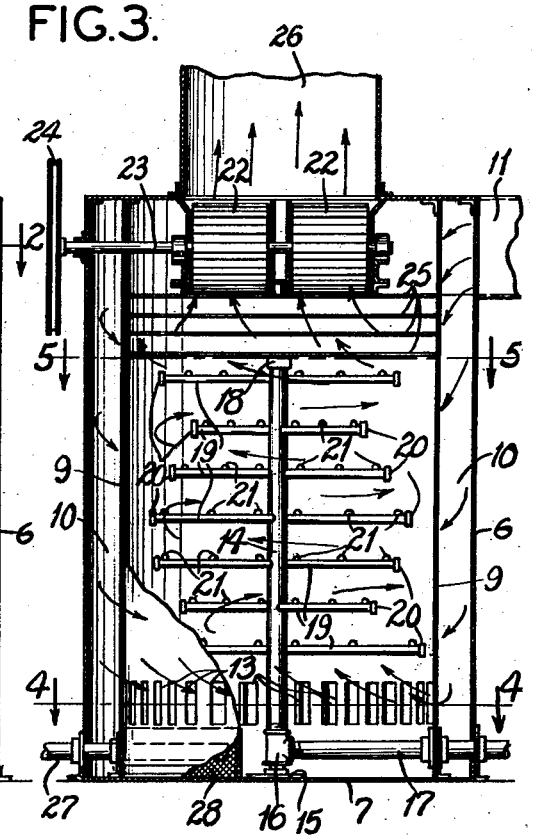
Fig. 3 is a vertical longitudinal section taken on the line 3—3 of Fig. 1.
Figure 2:
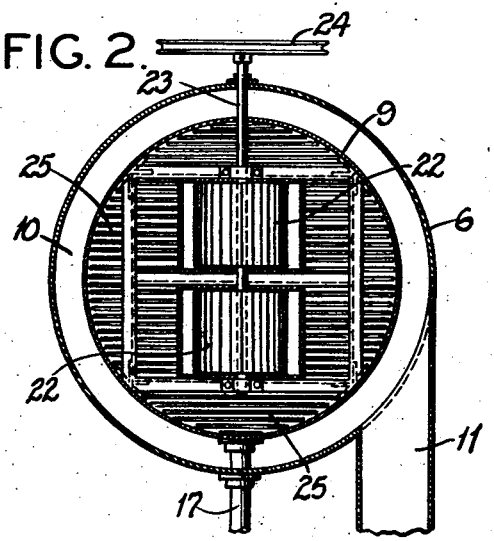
Fig. 2 is a horizontal sectional plan view taken on the line 2—2 of Fig. 1.
Figure 4:
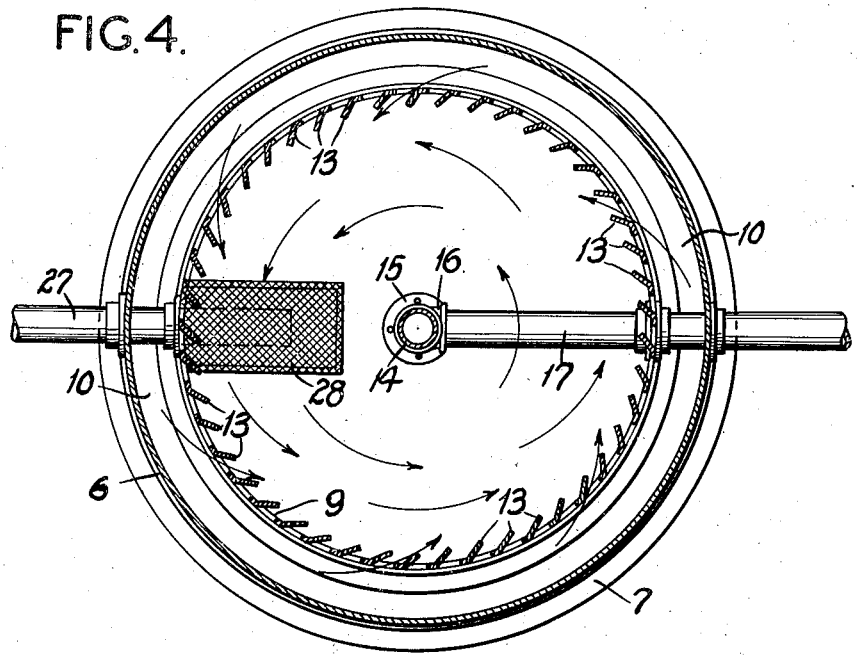
Fig. 4 is an enlarged sectional plan view taken on the line 4—4 of Fig. 3.
Figure 5:
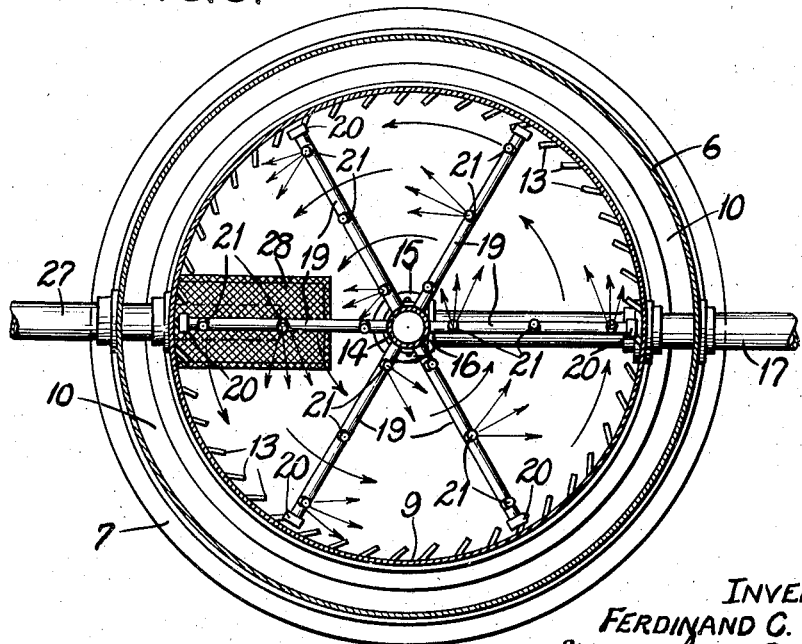
Fig. 5 is an enlarged sectional plan view taken on the line 5—5 of Fig. 3.

Numeral 6 designates a cylindrical shell having the base 7, the top 8 and the inner concentric shell 9, which is secured at the bottom to the base 7, and at the top to the top 8, forming the annular flue 10.

Numeral 11 designates the air intake pipe, which leads from the exterior of the device to the annular flue 10.

Numeral 9 designates a shell in which are formed the louvres 13. Numeral 14 designates a stand pipe, which is secured to the base 7 by means of the support 15. In the stand pipe 14 is connected the T 16. The pipe 17 is secured by threaded engagement into the T 16 and passes through the inner concentric shell 9 and the cylindrical shell 6. Numeral 18 designates a cap secured to the top of the stand pipe 14. Numerals 19 designate pipe arms secured radially, by threaded engagement, in the stand pipe 14, so as to establish fluid communication between the stand pipe 14 and the pipe arms 19. Numerals 20 designate caps secured to the outer ends of the pipe arms 19. The pipe arms 19 are of the same lengths.

Numerals 21 designate nozzles formed in the pipe arms 19. The orifices 21 are so positioned that when water passes through it is expelled in the inner concentric shell 9 tangentially. Numerals 22 designate blowers secured to the inner concentric shell 9 near the top. To the shaft 23 of the blowers 22 externally to the cylindrical shell is keyed the pulley 24. By means of a belt, not shown, the pulley 24 may be rotated and hence the blowers 22 caused to function. The blowers may be of any conventional type. Above the cap 18 and below the blowers 22, in the inner concentric shell 9, are positioned the eliminator plates 25. These plates are secured at their periphery to the inner concentric shell 9.

Numeral 26 designates the blower discharge, which is connected in the top 8 immediately above the air blowers 22. The eliminator plates are of standard type and consist simply of plates having chordal slots formed therein. Numeral 27 designates a pipe passing through the cylindrical shell 6, the annular flue 10 and the inner concentric shell 9. Numeral 28 designates a fine mesh water strainer, which is positioned on the base 7, within the inner concentric shell 9. The pipe 27 terminates within the fine mesh water strainer 28.

The passage of air and water through the device is indicated by arrows. The operation is as follows:

The blowers 22 are operated and draw the air through the air intake pipe 11 into the annular flue 10 through the louvres 13 into the inner concentric shell 9. Owing to the annular disposition of the louvres 13, the air enters the inner concentric shell 9 tangentially and moves spirally upwardly under and over and around the stand pipe 14, the pipe arms 19 and the nozzles 21 upwardly through the eliminator plates 25, through the blowers 22, through the blower discharge 26, back into the space surrounding the device. The water enters the pipe 17, passes through the T 16, the stand pipe 14, the pipe arms 19 and through the orifices 21. Due to the annular disposition of the orifices 21, the water passes into the inner concentric shell 9 tangentially and moves spirally. It is to be noticed at this point, that the air and water are both travelling spirally, and that the water is aiding rather than impeding the passage of the air through the device. Whatever entrained water remains in the air, when it reaches the eliminator plates 25, is precipitated and the conditioned air passes through the blowers and the blower discharge, as previously indicated. The water precipitates and drops downwardly, after having extracted foreign matter from the air, and passes through the fine mesh water strainer 28, into the pipe 27 to the waste line, or to a pump line for recirculation. The impurities are entrained in the fine mesh water strainer 28. By the process indicated, the air to be conditioned enters the device through the pipe 17 and passes out into the room through the blower discharge 26 in a conditioned form. Instead of the blower discharge 26, a grating may be supplied on the top 8.

What I claim is:

An air washer comprising an inner and outer shell, an air intake to said inner shell, a blower discharge connecting to said inner shell, a blower positioned in said inner shell adjacent said blower discharge, eliminator plates positioned in said inner shell adjacent said blower, tangential nozzles secured in said inner shell, a water strainer positioned in said inner shell, means of fluid communication between said strainer and the exterior of said air washer.

FERDINAND C. RUEHL.